United States Patent [19]

Goodman et al.

[11] Patent Number: 5,284,003
[45] Date of Patent: Feb. 8, 1994

[54] MACHINE FOR CONDITIONING PRODUCT IN A SEALED BAG

[75] Inventors: James A. Goodman, Glencoe; Fred A. Herdrich, Lake Villa, both of Ill.

[73] Assignee: Prototype Equipment Corporation, Lake Forest, Ill.

[21] Appl. No.: 59,431

[22] Filed: May 4, 1993

Related U.S. Application Data

[62] Division of Ser. No. 857,837, Mar. 26, 1992, Pat. No. 5,251,422.

[51] Int. Cl.[5] ............................................. B65B 61/24
[52] U.S. Cl. ...................................... 53/437; 53/249; 53/523; 198/762
[58] Field of Search ................. 53/437, 428, 523, 249, 53/113, 111 R, 393; 198/766, 762, 753, 631

[56] References Cited

U.S. PATENT DOCUMENTS

| | | | |
|---|---|---|---|
| 2,374,663 | 5/1945 | Carrier, Jr. | 198/753 X |
| 3,479,795 | 11/1969 | Martin | 53/160 |
| 3,604,689 | 9/1971 | Hutcheson et al. | 53/437 X |
| 3,676,977 | 7/1972 | Rothmann et al. | 53/437 |
| 4,027,459 | 6/1977 | Nieskens et al. | 53/59 R |
| 4,398,383 | 8/1983 | Prakken | 53/537 |
| 4,510,730 | 4/1985 | Edmondson | 53/53 |
| 4,524,564 | 6/1985 | Groom et al. | 53/449 |
| 4,555,013 | 11/1985 | Franklin | 198/689.1 |
| 4,649,740 | 3/1987 | Franklin | 73/49.3 |
| 4,671,101 | 6/1987 | Franklin | 73/49.3 |
| 4,800,703 | 1/1989 | Goodman | 53/53 |
| 4,850,627 | 7/1989 | Franklin | 294/2 |
| 4,864,801 | 9/1989 | Fallas | 53/446 |
| 4,918,907 | 4/1990 | Roach et al. | 53/453 |
| 4,922,688 | 5/1990 | Langen et al. | 198/631 X |
| 4,981,206 | 1/1991 | Franklin | 198/409 |

FOREIGN PATENT DOCUMENTS 4-189775 7/1992 Japan ..................................... 53/437

Primary Examiner—James F. Coan
Attorney, Agent, or Firm—Willian Brinks Hofer Gilson & Lione

[57] ABSTRACT

A machine for conditioning filled and sealed bags for testing, to assure that the bags are accurately tested without damaging the product contained in the bags, and for packaging the bags that have passed the test in cartons with the longitudinal axis of the bags arranged vertical.

12 Claims, 10 Drawing Sheets

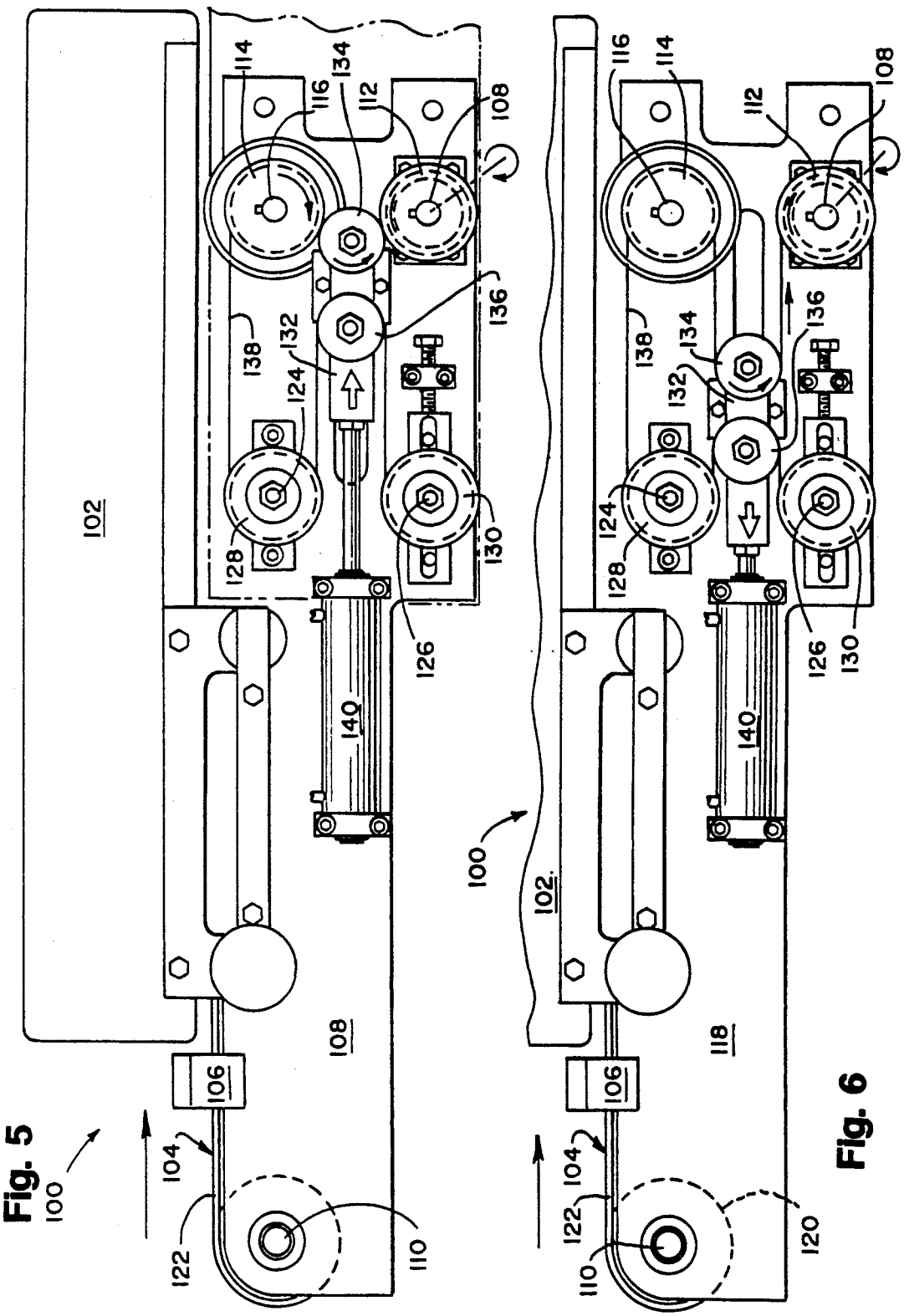

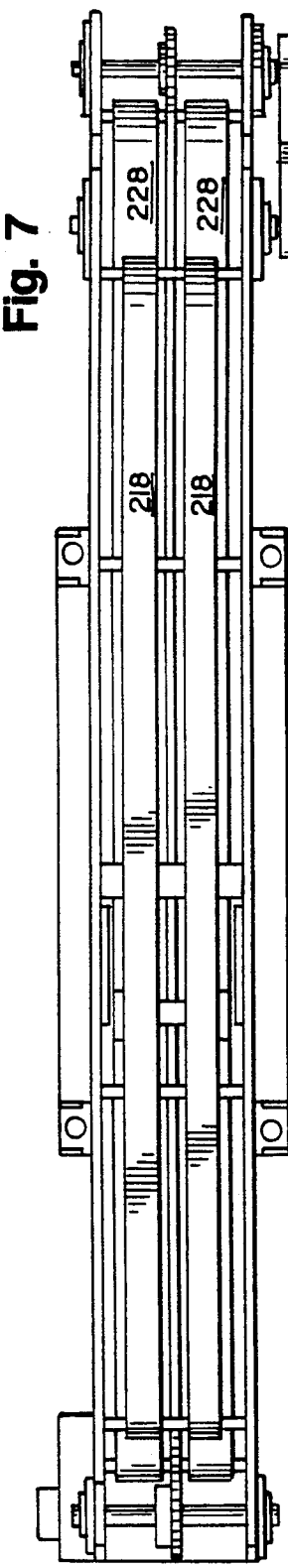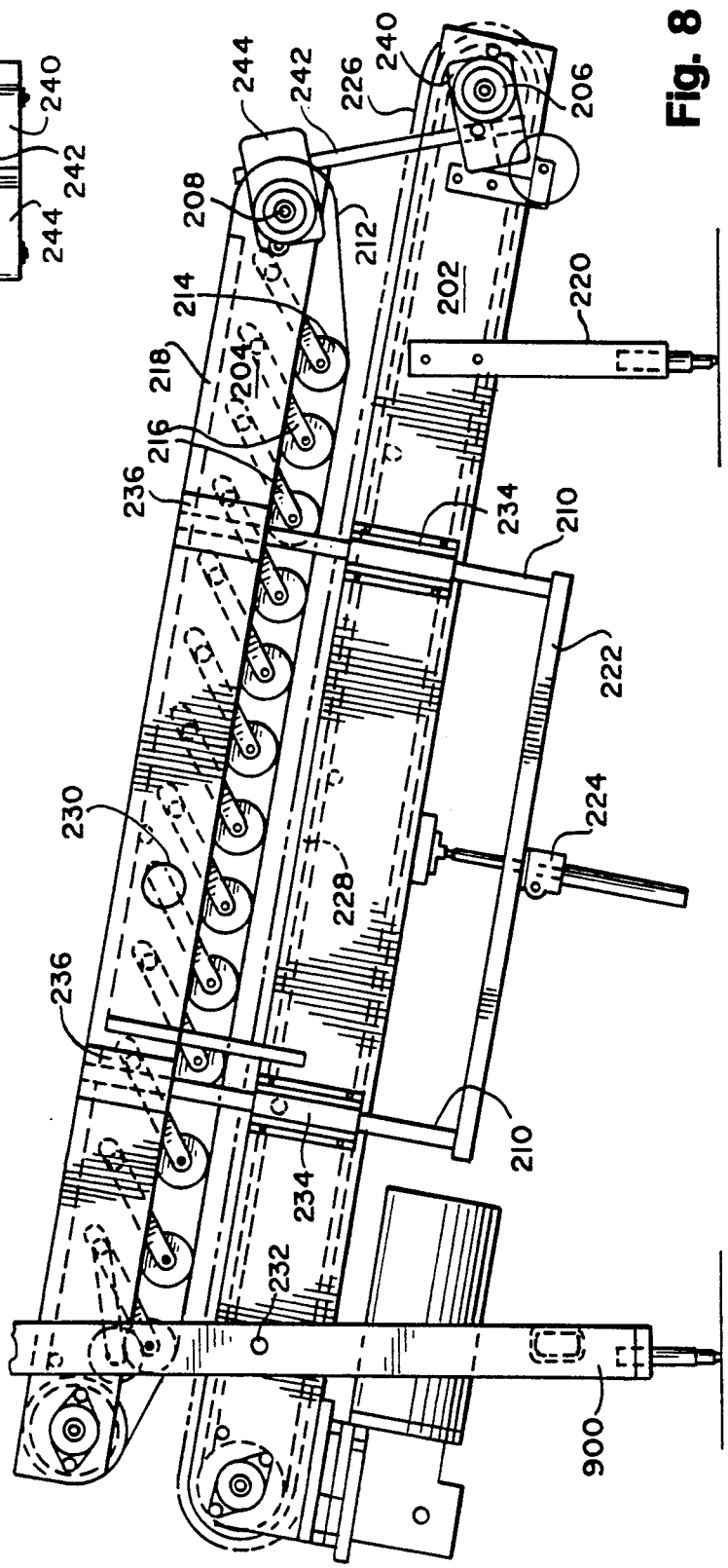

MACHINE FOR CONDITIONING PRODUCT IN A SEALED BAG

This is a divisional application of U.S. Ser. No. 07/857,837 filed Mar. 26, 1992, now U.S. Pat. No. 5,251,422 title Potato Chip Package Vertical Packaging Machine.

BACKGROUND OF THE INVENTION

The present invention relates to package handling apparatus for testing flexible packages and packing the acceptable packages vertically into cartons.

The development of equipment that can test and package fragile snack food such as potato chips to ensure delivery to the retail customer in an undamaged condition is the principal objective of this invention. In packaging fragile foods the bag is often inflated so that the sealed bag is in the form of a pillow and the product occupies the space defined by the bubble of air confined within the bag. The pillow like packages facilitates protecting the product from being crushed. If such a properly inflated bag is compressed between two flat surfaces, the bag will resist being compressed beyond a certain depth. This is assuming that the product contained in the bag is evenly distributed over a layer having a depth less than said certain depth. However in the process of filing and sealing the bags the product is dropped into the bag through the open top. As a result the product often becomes clustered in the bottom of the bag. If this concentration of material in the bottom of the bag is thicker than the certain depth then the inflated bag does not protect the product from being crushed. In fact when the product is clumped together it can be crushed and damaged in the test to determine whether the bag is properly pneumatically sealed. Thus concentration of the product into clumps must be avoided and clumps that do exist must be untangled and spread out without damaging the product.

Since the inflated bag can best protect the product when the product is spread over a level layer it is important that all testing and processing of the filled and pneumatically sealed bag be accomplished with the bag in a horizontal orientation.

Fragile foods packaged in inflated bags become vulnerable to being crushed when the bags are packaged in cartons with the longitudinal axis of the bag horizontal. This is particularly true when numerous layers of bags are involved. The weight from the upper bags exert pressure on lower bags which can result in the deflation of some lower bags. These deflated bags have lost their protective cushion and the product can then be crushed. This can be avoided if instead of packaging the bags horizontally they are packaged in a single layer with the longitudinal axis of the bag extending vertically.

A carton filled with vertically orientated bags can receive the maximum number of bags if the product in each bag was arranged in an even layer before packaging and retained in an even layer after packaging. However if during the process of packaging bags with their longitudinal axis extending vertically the product becomes concentrated in the bottom of the bag then a reduced number of bags will fit into the carton.

DESCRIPTION OF PRIOR ART

Many snack foods, such as potato chips, are fragile and can be easily damaged in handling and shipping. In an effort to protect fragile products such potato chips the bags are inflated to a degree before they are pneumatically sealed. The sealed package is in the form of a pillow and the contained product is thus protected. There are of course other advantages to pneumatically sealing packages such as to minimize deterioration of their contents. It is the practice to test the filled and sealed bags, prior to shipping, to determine whether they are properly sealed. I the past such test apparatus measures compressed the bag between two flat surfaces and measured the thickness of the bag. Provided the bag thickness exceeded a minimum amount the bag passes the test and was assumed to be properly inflated. An apparatus of this type is disclosed in U.S. Pat. No. 4,183,213. Such devised operate on the assumption that the product is evenly distributed in a relatively shallow layer. However if the product is not evenly distributed but rather is in a clump the prior art devices can damage the product or accept a punctured bag.

The use of vacuum pick up devices is common for handling and packaging light flexible bags. The vacuum pick up mechanism engages the broad side of the bag and places the bag in a carton in a horizontal orientation. Such a packaging apparatus is disclosed in U.S. Pat. No. 3,918,293. Several advantages are gained if rather than packaging the bags horizontally they are packaged vertically. For example, the number of bags in the carton can not be easily counted if the bags are in horizontal layers. It is important in delivering products to retail stores that the delivery person be able to look into the carton and be able to see at a glance how many bags are in the carton. If the bags have been packaged vertically this is possible. Also, for a retail store display, when the bag is arranged vertically in the carton, a side panel of the carton can be opened to display the product logo or name. Furthermore, the product is less likely to be damaged, in the vertical orientation, because layering of the product in the carton has been avoided. However vacuum pickup devices cannot reliably pick up bags from their top and deposit the bag vertically in a carton.

For this reason when bags packaged with their longitudinal axis vertical is desired the bags are manually packaged. When manually packaging bags vertically the product becomes concentrated in the bottom of the bags, with little or no product at the top of the bag. As a result, fewer than the maximum number of bags are packaged in a carton and because of the lack of product at the tops of the bags the bags fit loosely in the top of the carton, product damage is more likely.

SUMMARY OF THE INVENTION

The advantages of packaging fragile food packages vertically has been recognized but efforts to develop machines to accomplish this objective have not in the past been commercially successful. As a result, in the past if vertically packaged bags were required then the cartons were packaged manually, at considerable cost.

An objective of the present invention is to package flexible bags that have been filled and pneumatically sealed vertically into cartons.

Another object of the invention is to spread out any clumps of product in the sealed bag, distribute the product into an even horizontal layer, maintain the bags in a horizontal orientation while performing all testing and conveying of the bags.

Another object of the invention is to test the bag before packaging to insure that only those bags that meet requirements are packaged and shipped to customers.

Still another object of the invention is to maintain the bag in a substantial horizontal orientation during the testing and packaging procedure to insure more reliable test results.

Yet another object of the invention is to load a packaging head with horizontally orientated bags, rotate the packaging head 90° such that the open side of the packaging head through which the bags were loaded is now the bottom and the bags are retained in the packaging head and vertically orientated.

Still another object of the invention is to load a packaging head with horizontally orientated bags, each bag having an even layer of product, squeezing the bags while they are horizontal into the shape of the carton, rotating the carton shaped packaging head of bags 90° and lowering the packaging head into a carton shaped to retain the product in even layers.

The above and other objects are achieved, according to the present invention, by an machine for packaging bags, that have been filled with product inflated and pneumatically sealed, in cartons with the bags vertically orientated comprising:

an adjustable chute for receiving filled inflated and sealed bags of various sizes and depositing the bags on a machine conveyor system such that the bags lie horizontally in a consistent top-bottom orientation and such that the bags will be conveyed along their longitudinal axis, said machine conveyor system including a conditioning conveyor, means for accelerating and decelerating the forward speed of the conditioning conveyor such that the bags which fictionally adhere to the conveyor accelerate and decelerate with the conveyor while the product in the bags attempt to maintain a constant speed resulting in relative movement between the bag and the product contained therein and causing the product to be spread over an even horizontal layer within the bag, said machine conveyor system including a test conveyor, for testing a bag being conveyed to determine whether it is pneumatically sealed and inflated including a bottom conveyor upon which the bag is supported in a horizontal orientation and conveyed along its longitudinal axis and a top conveyor that is adjustable vertically relative to the bottom conveyor to accommodate bags of different size, the top conveyor exerting a downward pressure on the bag and being capable of vertical movement in response to resistance or lack thereof, sensing means for determining the elevation of the upper conveyor when a bag passed below thus indicating that the bag is properly inflated or below, and means for comparing this level to a predetermined level and deciding whether the bag is properly inflated or not and means for diverting bags that are not properly inflated out of the packaging process, said machine conveyor system including a weighing conveyor for weighing a bag being conveyed, and means for comparing the weight to a target weight and rejecting bags that do not meet the target weight from the packaging process, pick-up means for picking up a bag from the weighing conveyor and depositing the bag on an index conveyor, the bag being deposited horizontally on the index conveyor with the longitudinal axis of the bag transverse to the direction of movement of the index conveyor and the bottom of the bag adjacent a first edge of the index conveyor, drive means for the index conveyor, means for controlling the drive means for the index conveyor such that the index conveyor is moved a small increment (one bag width or less) after a bag has been deposited until the final bag in a layer of bags have been deposited, after the final bag in a layer of bags has been deposited on the index conveyor the means for controlling the drive means for the index conveyor causes the index convey to move the layer of bags to a packaging head pick-up station, a pick and place device operative to pick up an entire layer of bags, maintain them in their order and orientation, move the layer of bags over the first edge of the index conveyor and place the layer horizontally as the next layer on the support surface of the packaging head, and a packaging head mounted for rotation and reciprocation to facilitate movement between its loading and discharge attitudes, said packaging head has an open bottom that is substantially vertical when the packaging head is in its loading attitude and in a horizontal plane when the packaging head is in its discharge attitude, said packaging head including a concave-cylindrical top internal surface against which the tops of a full load of bags flare as the packaging head conforms the full load of bags into a generally keystone shape which prevents the bags from falling through the open bottom when the packaging head is in the discharge attitude.

These and other objects and advantages of the present invention will no doubt become apparent to those skilled in the art after having read the following detailed description of the preferred embodiment which are contained in and illustrated by the various drawing figures.

BRIEF DESCRIPTION OF THE DRAWING

The novel features which are characteristic of the invention are set forth in the appended claims. The invention itself, together with further objects and advantages will be best understood by reference to the following description of the illustrated embodiment taken in connection with the accompanying drawings, in which:

FIGS. 1A, 1B and 1C illustrate open cartons that have been filled with bags of different sizes by the subject packaging machine.

FIG. 5 is a side elevation view of the product conditioning conveyor with the change speed unit in the extended position.

FIG. 6 is a side elevation view of the product conditioning conveyor with the change speed unit in the retracted position.

FIG. 7 is a top plan view of the product test conveyor with the conveyor belt removed.

FIG. 8 is a side elevation view of the product test conveyor.

DETAILED DESCRIPTION

Figure 1:
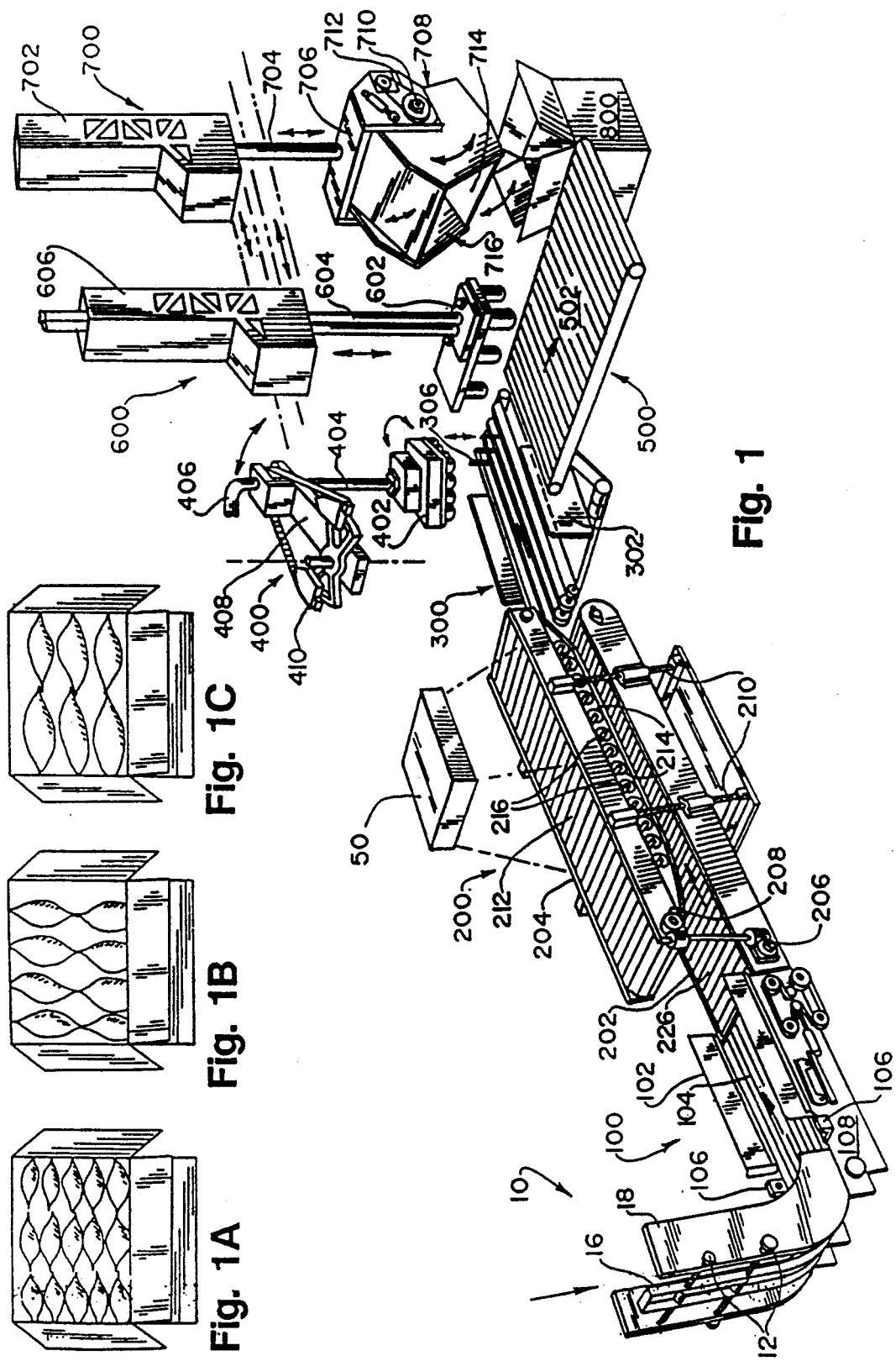
FIG. 1 is an perspective view of the complete packaging machine with support structures and frames eliminated so that the machine components can be better seen.

FIG. 1 is a perspective view of all components of the testing and packaging machine and their interrelationships. The product chute 10 is located relative to a form-fill-seal machine such that the filled bag descends into the product chute 10 directly from the form-feed-seal machine. Form-fill-seal machines form the bags from a continuous film of material and a formed bag is not severed from the continuous film until after it is filled and sealed. The filled bag is within the confines of the product chute 10 before it is severed from the next bag. Reference may be made to U.S. Pat. No. 3,849,965 for a disclosure of a form-fill-seal machine. Upon being severed, from the next bag to be dispensed from the form-fill-seal machine, the bag free falls down the product chute 10. The adjustment mechanism 12 can be manually adjusted to move the side guides 18 in and out to accommodate bags of different width. The adjustment mechanism which will be described in greater detail in a subsequent section of the specification caused each side guide 18 to move in equal increments thus ensuring that the bag will be centered with respect to the J-shaped chute 16. Although the adjustment mechanism are disclosed as manually actuated, automatic programmed adjustment of the side guides is contemplated. The hooked portion of the J-shaped chute changes the direction of the movement of the bag from vertical to horizontal. The bag enters the product chute bottom-end-first and it is important to the overall operation of the machine that this orientation be retained. Means, not shown in FIG. 1, are provided to prevent the bag from flipping over to a top-end-first orientation as it makes the transition from vertical to horizontal movement. It should be noted that use of the terms bottom-end-first and top-end-first assumes that the indicia on the bag is right-side-up such that it is easily readable. The indicia on the bags could intentionally be arranged such that it is upside-down when the bag emerges from the form-fill-seal machine.

The bag moves from the product chute 10 to the product conditioning conveyor 100. The bag enters the product conditioning conveyor 100 bottom-end-first, in a horizontal orientation and moving in the direction of its longitudinal axis. The product conditioning conveyor 100 includes adjustable guide means 102, that can be adjusted to the width of the bags being processed. The function of the adjustable guide means is to prevent the bag,s movement along its lateral axis. The adjustable guide means 102, which will be described in more detail in a subsequent section of the specification, are disclosed as manually operable, however automatic programmed operation of these guide means is contemplated.

The product conditioning conveyor 100 performs a very important process contributing to the overall successful operation of the testing and packaging machine. The product was gravity fed into an open bag in the form-fill-seal machine and then the bag was sealed along the top edge. During the filling and sealing operation the bag was in an orientation with its longitudinal axis vertical and as a result the bag entered the product chute 10 with the product concentrated in the bottom of the bag. Not only is the product concentrated in the bottom of the bag it may be intertwined and clumped together such that a very positive action will be required to untangle the clumped product and release the pieces of the product from each other. The product conditioning conveyor 100 performs the function of untangling any clumps of product and spreading the product over an even horizontal layer within the confines of the bag.

The conveyor surface 104 is driven at a constant forward speed by a mechanism to be described. The drive for the conveyor surface 104 also includes a change speed mechanism which causes the constant speed input to be increased and then decreased such that when the change speed mechanism is activated the conveyor moves at a speed in excess of its constant speed drive and then at a speed less then its constant speed drive. The material for the conveyor surface 104 is material that has a high coefficient of friction so that the bags tend to cling to the conveyor surface 104 and are accelerated and decelerated in unison with the conveyor surface 104. The product contained in the bag as a result of momentum tend to continue to move at their current velocity. However, the coefficient of friction between the product and the inner surface of the bag is such that as the bag changes velocity the product does not adhere to the inner surface of the bag but rather moves relative to the inner surface of the bag. By accelerating and decelerating the conveyor surface 104 the product is gently shifted back and forth within bag which results in untangling the product into an even layer within the bag.

A programmable machine control device 50 stores data that is used to operate the testing and packaging machine and receives and sends electronic signals to and from the various components, load cells, test devices, servo motors and cylinder controls to insure actuation at the proper time in the machine cycle, as is well know in the control art.

As the bag moves from the product chute 10 onto the product conditioning conveyor 100 it interrupts a beam of light, from a sensing device 106, which sends a signal to the machine control device 50 indicating that a bag has been deposited on the product conditioning conveyor 100. The machine control device 50 is programmed to energize the change speed device such that it cycles three or four times while the bag travels the length of the product conditioning conveyor 100. After the bag has been conveyed the length of the product conditioner conveyor 100 the product within the bag has been spread into an even horizontal layer. It is essential for the proper operation through the remaining machine cycle that this even horizontal layer of product be maintained. For this reason it is essential that in all subsequent operations and handling of the bag that its horizontal orientation be not changed. In this regard compromises for practical reasons should be expected and deviations from the horizontal in the order of 15°-20° can be tolerated.

The bag moves from the product conditioning conveyor 100 to the product test conveyor 200. In forming the bags for some fragile foods such as potato chips the bags are inflated and pneumatically sealed such that the bag is in the form of a pillow or a non-distensible balloon. This construction prevents the compression of the bag beyond a minimum depth. Bags that are not pneumatically sealed, properly inflated or punctured are not acceptable and must be identified and removed from the packaging process. The identification of such unacceptable bags is the function of the product test conveyor 200. The product test conveyor 200 has a lower conveyor 202 and an upper conveyor 204. The drive shafts 206 and 208 for the lower 202 and the upper 204 conveyors are interconnected to thus coordinate their speed. Driving the upper 204 and lower 202 conveyors at equal speeds is essential to the overall operation of the machine because if they are moving at unequal speeds there would be a tendency for the bags to role which would disrupt the even spread of product that was attained in the product conditioning conveyor 100.

A jack 224 (not seen in FIG. 1, see FIGS. 2 and 8) is provided to adjust the upper conveyor 204 vertically relative to the lower conveyor 202 to accommodate bags of different size. The continuous conveyor surface 212 of the upper conveyor 204 has some slack and there are a series of rollers 214, carried on the free ends of pivotally mounted arms 216, that exert a downward force on the inner surface of the bottom expanse of the continuous conveyor surface 212. As a bag is conveyed along the test conveyor 200, pressure is exerted by rollers 214 to squeeze the bags between the upper 204 and lower 202 conveyors such that properly inflated bags are flattened to their target thickness and air is removed from improperly sealed bags or bags having punctures. If however the bag is over or under inflated or has been punctured the target thickness will not be attained. Properly inflated bags will cause the pivotally mounted rollers 214 to be spaced from the surface of the lower conveyor 202 a target distance for the bags being processed. A sensing device is connected to the pivot axis of one of the pivotally mounted arms 216 which senses the rotation of the pivot axis which can be correlated to the thickness of the bag when it passed under the sensing roller. If the sensing roller is not within an acceptable range from the target distance then the bag passing below the sensing roller is identified as an unacceptable bag and will be removed from the packaging process. The identification of an unacceptable bag is transmitted to the machine control device 50 which is programmed to eject the unacceptable bag at the next component station.

The product test conveyor 200 discharges all bags to the weigh scale conveyor 300. The bottom expanse of the weigh scale conveyor surface 304 follows a V-shaped course which creates space to mount a load cell or scale 302 below the upper expanse of conveyor surface 304. It should be noted that the use of a load cell for the purpose of generating an electrical signal that is sent to the machine control device 50 is the preferred embodiment, however a conventional scale could also be used for this purpose. The term, scale, as used herein means any means that can generate a signal that can be interpreted or translated into the weight of the bag. Bags being conveyed over the weigh scale conveyor surface 304 are weighed and a signal indicating their weight is transmitted to the machine control device 50 which compares the transmitted weight to the target weight. If a bag failed either or both test, inflation or weight, the stop arms 306 are lowered and the unacceptable bag is ejected over the discharge edge of the conveyor surface 304. Stop arms 306 are controlled by the machine control device 50. Bags that were judged acceptable by both the inflation test and the weight test are elevated by the lift arms 312 to a level at which they will be picked up by the vacuum pickup head of the product transfer arm 400.

The function of the product transfer arm 400 is to pick up acceptable bags from the weigh scale conveyor surface 304, rotate the bag 180° if necessary, and deposit it on the index conveyor 500. The mechanism for controlling the product transfer arm 400 will be discussed in detail later in the specification. These mechanisms include a vacuum pick up head 402 that is mounted on the bottom end of a vertical shaft 404. Vertical shaft 404 is mounted to rotate and to swing during operation and for vertical adjustment to accommodate bags of different size. A vacuum tube 406 is connected to a vacuum pump (not shown in FIG. 1). The vertical shaft 404 is carried by the free end of a swing arm 408 which is caused to swing by swing mechanism 410. Prior to being picked up by the vacuum pick up head 402 the bag has been traveling through the system in the direction of the bags longitudinal axis in a bottom-end-first orientation. The product transfer arm 400 rotates the bag 180° such that relative to its movement up to this point in the cycle it is now in a top-end-first orientation. The bag is however deposited transversely on the index conveyor 500. The index conveyor, is located and arranged relative to the weigh scale conveyor 300 such that it, will convey the product in a direction normal to the direction of travel that the product had when it was on the weigh scale conveyor. The direction of travel of both the weigh scale conveyor 300 and the index conveyor 500 are indicated, in FIG. 1, by arrows. Furthermore when the bag is deposited on the index conveyor it will move in a direction transverse to its longitudinal axis.

The drive for the index conveyor 500 is controlled by the machine control device 50 which is programmed for the particular size being packaged. After a bag is deposited on the index conveyor 500 by the product transfer arm 400 the index conveyor indexes to the right as seen in FIG. 1. It should be noted that the product transfer arm 400 always deposits bags at the same location and the conveyor surface 502 is indexed relative to this location. The distance that it indexes is a factor of the bag size. It is the purpose of the index conveyor 500 to accumulate a layer of bags equal to the length of the carton that they are to be packaged in. Bags making up this layer sometimes overlap slightly and in this instance the index conveyor would index a distance less than the width of the bags being processed. When a complete layer of bags have been accumulated on the index conveyor surface 502 the index conveyor then indexes to the right, as seen in FIG. 1, to the packaging head pick-up station which is immediately below the pick and place vacuum pick-up head 602.

The pick and place device 600 includes a vacuum pick-up head 602 that is equal in length to the layer of bags that it picks up. The length of the pick-up head is measured in the direction of movement of the index conveyor 500. The vacuum pick-up head 602 is secured to the bottom end of a reciprocating tube 604 which functions as a vacuum conduit for the vacuum pick-up head. The reciprocating tube 604 is operatively connected to the pick and place foundation tower 606 which is mounted on a frame work for reciprocating movement. The reciprocating movement of foundation tower 606 will be discussed in greater detail with reference to FIG. 13.

After the index conveyor 500 moves a layer of bags to the packaging head pick-up station the packaging head vacuum pick-up head 602 moves downwardly and the layer of bags is picked up as a unit by the pick-up head. This downwardly movement of the pick-up head is controlled by the machine control device 50 which then causes the pick-up head to be elevated. Another mechanism, not shown in FIG. 1 also controlled by the machine control device 50, then causes the pick and place foundation tower 606 to move horizontally toward the packaging apparatus 700. The vacuum pick-up head 602 then moves downwardly and the vacuum is released thus depositing the layer of bags in the packaging apparatus. It should be noted that when the next layer of bags is delivered to the packaging apparatus 700 by the vacuum pick-up head 602 the vacuum pick-up head does not move downwardly as far as it did the last time. For each subsequent layer the vacuum pick-up head is programmed, by the machine control device 50, to stop one layer higher and a fixed horizontal distance from the concave top surface 720 such that the tops of all bags engage the concave top surface 720.

The packaging apparatus 700 functions to receive layers of bags from the pick and place device 600 stacked one layer on top of the previous layer until sufficient layers are accumulated to fill a carton and to then deposit its carton load of bags into the waiting carton. The packaging apparatus includes a packaging head foundation 702 that is secured in its operating position on a framework, not shown in FIG. 1. The location of the packaging head foundation 702 on the framework can be adjusted for various products but is not movable during an operating cycle. A reciprocating shaft 704 is operatively connected to the packaging head foundation 702 for vertical reciprocation relative thereto. This reciprocation is controlled by the machine control device 50. A generally C-shaped packaging head support 706 is fixed to the lower end of the shaft 704. The packaging head 708 is pivotally supported on the support 706 about a horizontal pivot axis 710. The packaging head is pivoted between a loading attitude and a discharge attitude. When the packaging head 708 is in its discharge attitude it is in the form of an open ended box. The open end of this box is identified in FIG. 1 as 716. The means 712 for pivoting the packaging head 708 are controlled by the machine control device 50. A brake means 722 is provided for securing the packaging head in loading attitude. As shown in FIG. 1 the packaging head is in the process of being rotated from its loading attitude to its discharge attitude. It should be noted that during operation of the machine the packaging head would be filled with bags at this stage of the packaging cycle. The carton to be filled with bags is identified as 800 in FIG. 1.

FIGS. 1A, 1B and 1C are unstructured figures showing cartons that have been filled with bags of different sizes. FIG. 1A illustrates a carton of small bags, FIG. 1B a carton of medium size bags and FIG. 1C a carton of large bags.

Figure 2:
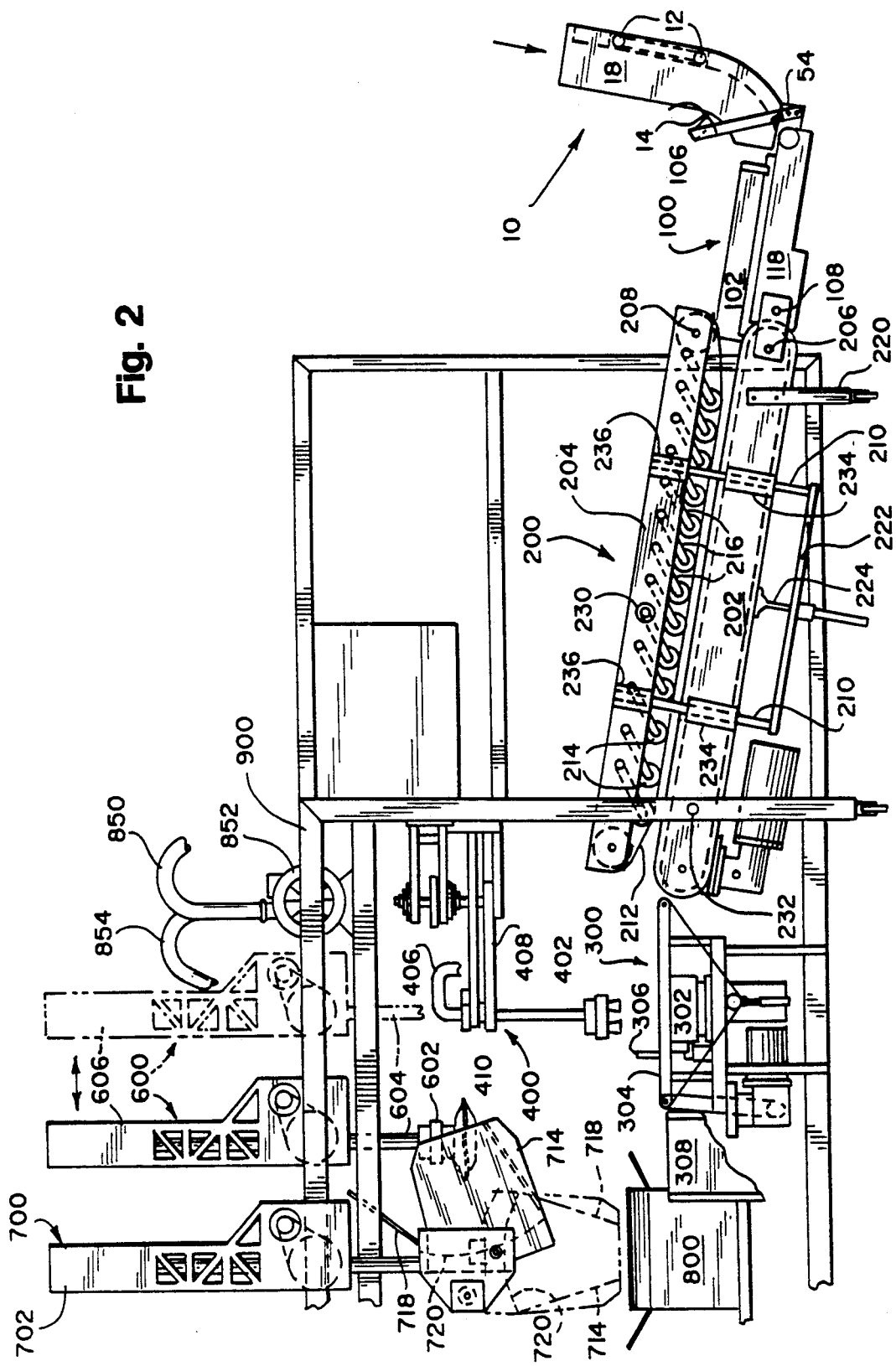
FIG. 2 is a side elevation view of the complete packaging machine with some of the support structure and frames included.

Referring now to FIG. 2 which is a side elevation view of the entire machine in which most of the major components can be seen. It should be noted that this view includes framework that was not shown in FIG. 1. FIG. 2 views the machine from the opposite side of the product conditioning conveyor 100, product test conveyor 200 and the weigh scale conveyor 300 as seen in FIG. 1 and thus the product flows in the opposite direction, from right to left, in FIG. 2.

The bag from the form-fill-seal machine descends into the product chute 10 in a bottom-end-first orientation, where its movement is confined by the adjustable side guides 18. As the direction of movement of the bag changes from vertical to horizontal means 14 are provided to prevent the bag from flipping over to a top-end-first orientation.

As the bag enters the product conditioning conveyor 100 it interrupts a beam of light from a sensing device 106 which results in the energization of the speed change device. The conveyor surface 104 accelerates and decelerates three or more times during the time period that elapses for a bag to travel the length of the product conditioning conveyor 100. The product conditioning conveyor is driven by a constant speed rotating shaft 108 which is belt driven from the drive shaft of the product test conveyor 200. The drive for the product conditioning conveyor will be discussed in detail with reference to FIGS. 5 and 6.

The lower conveyor 202 is supported on the floor by legs 220 at the receiving end and by a pivot shaft 232 adjacent the discharge end. Pivot shaft 232 is supported in the framework 900. A rectangular shaped support carriage 222 is supported below the lower conveyor 202 by a jack 224. A guide rod 210 is secured to each corner of the rectangular shaped support carriage 222 and extends upwardly therefrom. The guide rods 210 extend through sleeves 234 secured to the outer sides of the lower conveyor 202 and slide relative thereto. The upper ends are fixed to the upper conveyor 204 at 236. As a result of adjusting the jack 224 the upper conveyor 204 can be adjusted vertically relative to the lower conveyor 202 to accommodated bags of different size. Control of the jack 224 could be controlled automatically by providing suitable mechanism that would be controlled by the machine control device 50. The lower conveyor 202 is driven by drive shaft 206 and the upper conveyor 204 is driven by drive shaft 208. The interconnecting drive for the lower 202 and upper 204 conveyors of the product test conveyor 200 will be discussed in more detail with reference to FIGS. 7 and 8. A series of rollers 214 carried on the free ends of pivotally mounted arms 216 exert a downward force on the inner surface of the bottom expanse of the continuous conveyor surface 212.

The bag being conveyed is squeezed between the continuous conveyor surface 212 of the upper conveyor 202 and the continuous conveyor surface 226 of the lower conveyor 202. If the bag is properly inflated the continuous conveyor surfaces 212 and 226 will be spaced from each other a target distance. The target distance is determined for each size bag and is programmed into the machine control device 50. A sensing device 230, for example a linear voltage displacement transducer, is connected to the pivot shaft of one of the pivotally mounted arms 216. If the bag passing under the sensing roller causes the roller 214 to deviate, from the target distance from the surface of the continuous conveyor surface 226, it is sensed by the sensing device 230. The sensing device 230 transmits a signal to the machine control device 50, and the bag that caused the roller 214 to deviate is identified as unacceptable. This unacceptable bag will be ejected from the packaging process at the next processing station.

Bags discharged from the product test conveyor 200 are deposited on the conveyor surface 304 of the weigh scale conveyor 300. The bottom expanse of the weigh scale conveyor surface 304 follows a V-shaped course which allows a load cell or scale 302 to be mounted between the top and bottom expanses. A signal reflecting the weight of a bag is transmitted to the machine control device 50 and compared to a target weight. If a bag failed either or both test, inflation or weight, the stop arms 306 are lowered and the unacceptable bag is ejected over the discharge edge of the conveyor surface 304. The ejected bag slides down an ejection ramp 308 for disposal.

The product transfer arm 400 picks up bags that have passed the test, rotates the bag 180° if necessary, swings it over to a position overlying the index conveyor 500 and deposits it on the index conveyor 500. This process is repeated until a layer of bags have been accumulated on the index conveyor 500 at which time the index conveyor carries the entire layer of bags to the packaging head pick-up station. The product transfer arm 400 includes a vacuum pick-up head 402 which reacts with the broad side of the bag, maintaining it in the horizontal orientation as it transfers the bag from the weigh scale conveyor 300 to the index conveyor 500. A vacuum tube 406, located at the top of the transfer arm 400 is connected through flexible conduit (not shown) to the a tube 850 that is connected to the inlet of a vacuum pump 852. The vacuum pump 852 is mounted above the index conveyor 500 on framework 900.

The pick and place device 600 includes a vacuum pick-up head 602 which picks up a complete layer of bags from the index conveyor 500. The vacuum pick-up head 602 is carried by the bottom end of a reciprocation tube 604 which is operatively supported in the pick and place foundation tower 606. The pick and place foundation tower 606 is supported for horizontal movement on the framework 900. A second vacuum pump 852 is mounted on the framework 900, behind the pump 852 seen in FIG. 2, which supplies a vacuum to vacuum puck-up head 602 through a tube 854. The pick and place foundation tower 606, in FIG. 2, is shown in two locations. The first location, with the reciprocation tube 604 shown in broken lines, is the location where it picks up the complete layer of bags from the index conveyor 500. The second location, showing an end view of the layer of bags, is at a location to the right of where it would deposit the layer of bags in the packaging head 708.

The packaging apparatus 700 includes a packaging head foundation 702 that is fixed to the framework 900. A reciprocating shaft 704 is operatively carried by the foundation 702 and supports the packaging head 708 through a support 706 at its lower end. In FIG. 2 the packaging head 708 is shown in full lines in its loading attitude. In the loading attitude the bottom clamping door of the packaging head functions as a support surface for receiving the layers of bags from the pick and place vacuum pick-up head 602. The upper clamping door 718 is raised to a position approaching the vertical to allow the pick and place device 600 access over the lower clamping door 714.

The packaging head 708 is shown in its loading attitude, in broken lines, in FIG. 2. In the loading attitude the open bottom 716 of the packaging head is horizontal however with the clamping doors 714 and 718 converging downwardly and the bags urged against the cylindrical concave top surface 720 the bags are retained in the packaging head 708. The packaging head, loaded with a full carton of bags is lowered into the carton 800 and the clamping doors 714 and 718 are swung to a parallel orientation. With the clamping doors 714 and 718 parallel the load of bags are released from the packaging head 708 and the packaging head 708 can be withdrawn empty from the carton 800.

Figure 3:
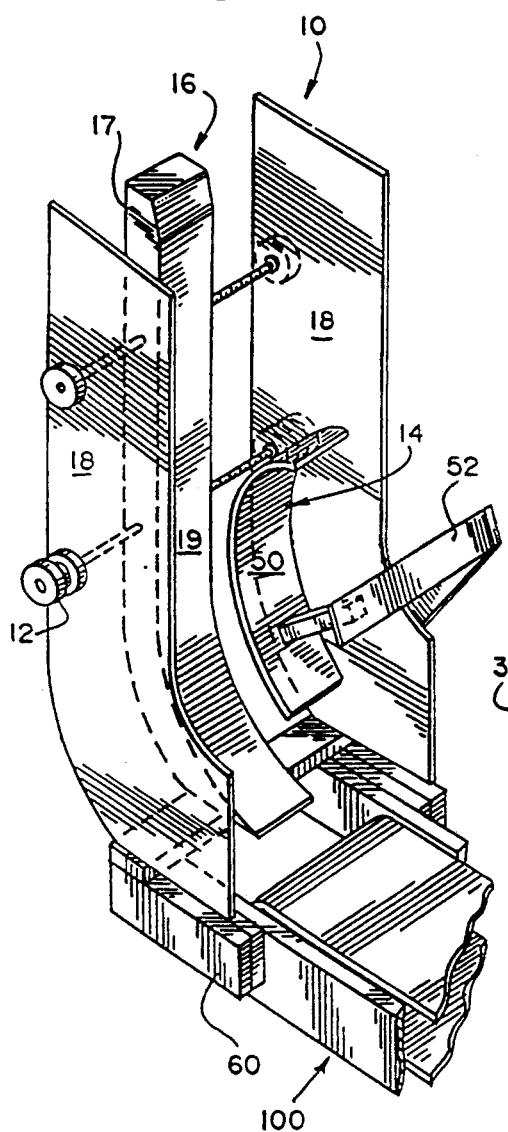
FIG. 3 is an perspective view of the product chute.
Figure 4:
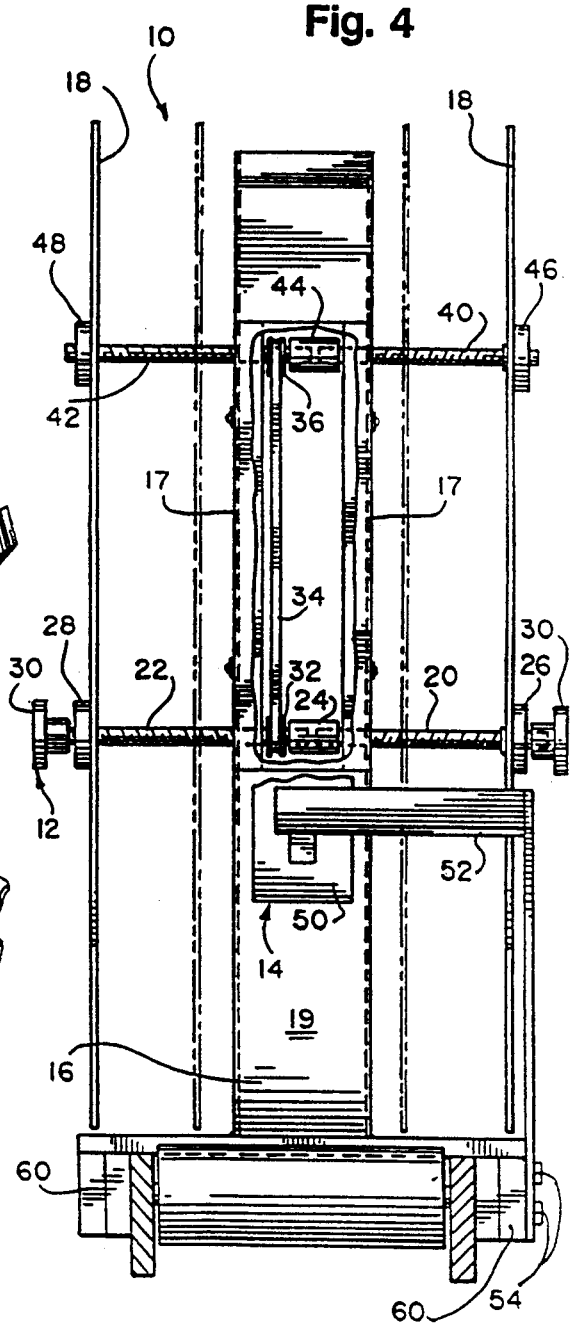
FIG. 4 is a front elevation view of the product chute having portions broken away to better show the adjustment mechanism.

Referring now to FIGS. 3 and 4 which illustrate the details of the product chute 10. Product chute 10 includes a frame 60 that is secured to the frame of the product conditioning conveyor 100. The lower end of a J-shaped chute 16 is secured to the frame 60 and extends upwardly therefrom. The J-shaped chute has a C-shaped cross section such that it has a product support surface 19 and a pair of flanges 17. A lower rod is made up of a left hand threaded segment 20, a right hand threaded segment 22 and a coupling element 24 that secures the two segments together. The outer ends of segments 20 and 22 are threaded through flange nuts 26 and 28 respectively that are secured to the side guide plates 18. Guide plates 18 include product engaging surfaces that are substantially perpendicular to the product support surface 19 of J-shaped chute 16. An upper rod is made up of a left hand threaded segment 40, a right hand threaded segment 42 and a connecting coupling 44. The outer ends of segments 40 and 42 are threaded in flange nuts 46 and 48 that are secured to side guide plates 18.

The upper and lower rods extend through openings in flanges 17 of the J-shaped chute 16. It should be noted that side guide plates 18 extend both above and below the product support surface of the J-shaped chute 16 and are spaced laterally from the flanges 17 of the J-shaped chute 16. This relationship is important to the proper operation of the product chute because it is avoids a common problem in adjustable width chutes. In prior art adjustable width chutes the side guide plates and product surface are closely adjacent to each other and present a small slot or clearance therebetween. The sealed edges of plastic bags often enter this slot or clearance and become wedged and cause the bag to be damaged or hung up. This potential problem is avoided by not having the edge of the guide plate adjacent to the product conveying surface of the J-shaped chute.

A pulley 32, is secured to segment 22 and a pulley 36 is secured to segment 42 such that pulleys 32 and 36 are vertically aligned. A belt 34 connects pulley 32 to pulley 36 to thus transmit rotation of the lower rod to the upper rod. Handles 30 are fixed to the outer most ends of segments 20 and 22. As either handle is turned the side guide plates 18 are moved either in or out depending upon the direction of handle rotation. The identical rotary motion imparted through the handles 30 to the lower rod is transmitted through belt 34 to the upper rod, which causes the same inner or outer movement to the corresponding portions of side guides 18.

Guide means 14, as best seen in FIG. 3, are provided to maintain the bag in its bottom-end-first orientation as its direction of movement changes from vertical to horizontal. Guide means 14 includes an arcuate guide strip 50 that generally conforms to the shape of and is spaced from the hook portion of the J-shaped chute 16. Guide strip 50 has a mounting bracket 52 secured thereto which is adjustable mounted by means 54 (see FIG. 2) to the frame 60. The guide strip 50 is adjusted toward and away from the hook portion of J-shaped chute 16 to accommodated bags of different size.

Referring now to FIGS. 5 and 6 which illustrates details of the mechanism for accelerating and decelerating the constant forward speed of the conveyor surface 104 of the product conditioning conveyor 100. The product conditioning conveyor 100 has a frame structure 118 on each side that are joined at the receiving end of the conveyor by a driven roller 120 supported on a shaft 110 and at the discharge end by a drive roller (not shown) supported by a shaft 116. Shaft 116 has a sprocket 114 secured to its free end as seen in FIGS. 5 and 6. The conveyor surface 104 is wrapped around and driven by the drive and driven rollers. The drive and driven rollers have a plurality of parallel groves formed in their cylindrical surfaces into which continuous belts 122 are seated. The continuous belts 122 are made of an elastic material having a high coefficient of friction. The plurality of continuous belts 122 make up the conveyor surface 104.

Adjustable guide means 102 are mounted on the frame structures 118 and can be adjusted in equal increments relative to the conveyor surface 104 to accommodate bags of different width. The adjustment mechanism for guide means 102 is the same as that used for the side guides 18 on the product chute 10. Reference may be had to the earlier discussion for the details of this mechanical mechanism.

A sensing device 106 is mounted on frame structure 118 at the receiving end of the product conditioning conveyor 100 which directs a beam of light across the path of a bag that has been deposited on the conveyor surface 104. When the beam of light is interrupted by a bag the sensing device sends a signal to the machine control device 50 which is programmed to energize air cylinder 140 a number of times. Air cylinder 140 is energized a sufficient number of times to accelerate and decelerate the conveyor surface 104 three or four times in the time period that it takes the bag to travel the length of the product conditioning conveyor 100.

A constant speed input drive shaft 108 is journaled in the frame structures 118. As is illustrated in FIG. 2 drive shaft 108 receives its drive from drive shaft 206 of the product test conveyor 200. A sprocket 112 is secured to the free end of drive shaft 108 on the side of the product conditioning conveyor 100 seen in FIGS. 5 and 6.

A pair of fixed idler shafts 124 and 126, having sprockets 128 and 130 respectively secured thereto, are mounted on the frame structure 118 seen in FIGS. 5 and 6. A change speed unit 132 is mounted for horizontal reciprocating movement on the frame structure 118 seen in FIGS. 5 and 6. The change speed unit 132 has a first 134 and a second 136 sprocket mounted thereon. Since the change speed unit 132 reciprocates the sprockets 132 and 134 are referred to as movable sprockets. Means for reciprocating the change speed unit 132, an air cylinder 140, is mounted on the frame structure 118 as seen in FIGS. 5 and 6. Air cylinder 140 is energized in response to signals from the machine control device 50. A continuous belt 138 is strung around the series of sprockets included in the drive system. The continuous belt 138 extends from the drive sprocket 112 to the fixed sprocket 130, up and around the second movable sprocket 136, around the fixed sprocket 128, around conveyor drive sprocket 114, down and around first movable sprocket 134 and then back to the drive sprocket 112.

With the change speed unit 132 located to the right as seen in FIG. 5 and the belt 138 moving at a constant speed in the direction indicated by the arrows, upon energization of air cylinder 140 causing it to contract, and move the change speed unit 132 to the left, to the location seen in FIG. 6, the constant speed of the conveyor surface 104 will be accelerated. This can be visualized if you represent the constant speed of the belt 138 as it extends from conveyor drive sprocket 140 (FIG. 5) as a vector extending in the direction of the belt movement, and the movement of the movable sprocket 134 as a vector extending in the direction that movable sprocket 136 moves from its location in FIG. 5 to its location in FIG. 6. The vectors are extending in the same directions and thus when the vectors are combined the result is a vector of greater magnitude, extending in the same direction. When this process is reversed, the change speed unit 132 moves from its location in FIG. 6 to its location in FIG. 5 then the two vectors are extending in opposite directions and when they are combined the constant speed vector is decreased by an amount equal to the magnitude of the change speed vector.

Referring now to FIGS. 7 and 8 which are side and top views respectively of the product test conveyor. The product test conveyor 200 includes a lower conveyor 202 and an upper conveyor 204. As bags are discharged from the product conditioning conveyor 100 they are deposited on the continuous conveyor surface 226 (shown in broken lines) of the lower conveyor 202. As discussed earlier in the specification it is important to the overall proper operation of the machine that the bags be maintained substantially horizontal throughout the packaging process. The reason that this is important is that the product contained in the bags has been spread into an even layer by the product conditioning conveyor 100 and in order for the product test conveyor 200 to operate properly it must remain in the even layer. In FIG. 8 the product test conveyor is shown elevated to illustrate the fact that some variation from the horizontal can be tolerated without adversely effecting the operation of the machine. In this regard once the product contained in the bag has been spread into an even layer it is unlikely that it will shift unless the bag is elevated above the products angle of repose. The elevation of the product test conveyor 200 as seen in FIG. 8 is well below the products angle of repose.

The drive for the lower conveyor 202 is received through the drive shaft 260. The lower conveyor has a pair of support slats 228, as best seen in FIG. 7, located below the continuous conveyor surface 226 to provide a base support therefor. A pair of legs 220 supported on the plant floor support the receiving end of the lower conveyor 202. Legs 220 include means for vertical adjustment. The discharge end of the lower conveyor 202 is pivotally supported about a pivot shaft 232 that is supported in the framework 900. Thus as the receiving end of lower conveyor 202 is adjusted vertically the discharge end can pivot about pivot shaft 232.

The upper conveyor 204 is driven by an input drive shaft 208 which drives the continuous conveyor surface 212 at the same speed as continuous conveyor surface 226. The upper conveyor 204 has a pair of support slats 218 that located under the upper expanse of the continuous conveyor surface 212 and provide support for it.

A rectangular shaped support carriage 222 is supported from the lower surface of the lower conveyor 202 by a jack 224. A guide rod 210 is connected to each corner of the support carriage 222 and are sustained in position by sliding through sleeves 234. The upper ends of guide rods 210 are secured to the upper conveyor 204 by means 236. By adjusting jack 224 the rectangular shaped support carriage is moved relative to the lower conveyor and the connected guide rods 210 move with it. Since the upper ends of guide rods 210 are fixed to the upper conveyor 204 the upper conveyor 204 is raised or lowered relative to the lower conveyor 202. This adjustment allows bags of different thickness to be tested by the product test conveyor 200.

The continuous conveyor surface 212 has some slack in it which is taken up by a series of rollers 214 carried by the free ends of pivot arms 216. The rollers 214 and pivot arms 216 exert a downward gravitational force on the lower expanse of the continuous conveyor surface 212. This downward force flattens bags being conveyed between the upper 212 and lower 226 continuous conveyor surfaces such that properly inflated bags are squeezed to their target thickness. If a bag is not inflated the rollers will drop to a position closer to the upper expanse of the continuous conveyor surface 226. A sensing device 230 is connected to the pivot rod of one of the pivot arms 216 to sense the location of its associated roller 214 relative to the upper surface of the lower continuous conveyor surface 226. This information is transmitted to the machine control device 50 and identifies the bag beneath the sensing roller as acceptable or unacceptable. The bags that test unacceptable will be ejected at the weigh scale conveyor 300.

The drive shaft 206 for the lower conveyor 202 extends through a transmission 240 which has an hex, key or square output drive shaft 242 that extends upwardly toward drive shaft 208 for the upper conveyor 204. Upper drive shaft 208 extends through a transmission 244 that includes an input that can slidably receive the hex, key or square output drive shaft 242. Through this drive arrangement the upper continuous conveyor surface 212 can be driven at the same speed as lower continuous conveyor surface 226 and this drive can accommodate adjustment of the upper conveyor 204 relative to the lower conveyor 202. The upper 244 and lower 240 transmissions have reverse gearing so that the upper surface of the lower conveyor and the lower surface of the upper conveyor move in the same direction, as depicted by the arrows.

Figure 9:
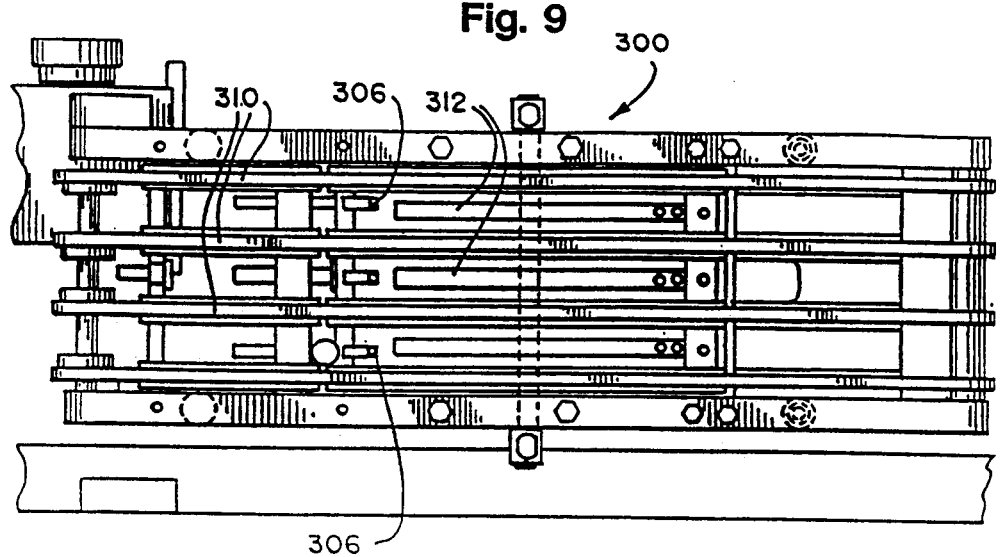
FIG. 9 is a top plan view of the weigh scale conveyor.
Figure 10:
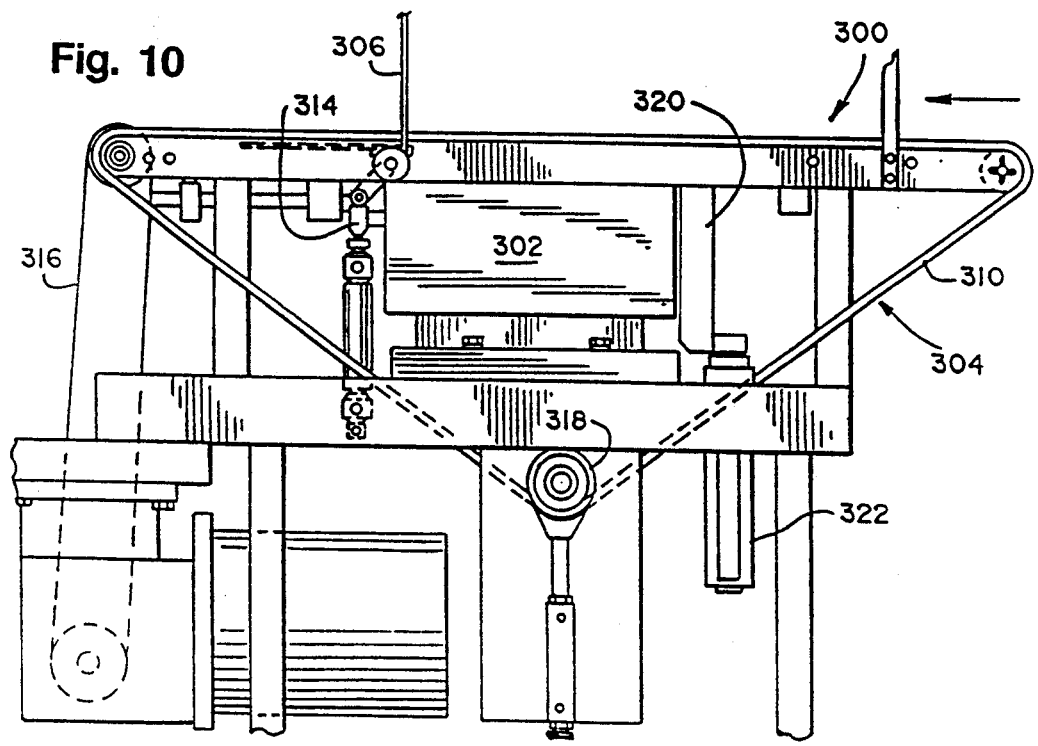
FIG. 10 is a side elevation view of the weigh scale conveyor.

Referring now to FIGS. 9 and 10 which are top and side views respectively of the weigh scale conveyor 300. All bags are transferred from the product test conveyor 200 to the conveyor surface 304 of the weigh scale conveyor 300. The conveyor surface 304 has a horizontal upper expanse and a V-shaped lower expanse. The lower expanse raps around a bottom roller 318 which can be adjusted for proper tension. The conveyor surface 304 is formed of a plurality of chains 310 or belts. A set of stop arms 306, that can be raised and lower by mechanism 314, functions to stop the bags that are being conveyed along the surface of the weigh scale conveyor. The stop arms are located such that the bag is stopped immediately below the vacuum pick up head 402.

A load cell or scale 302 is mounted between the horizontal upper expanse of the conveyor surface 304 and its V-shaped bottom expanse. The weight of the product causes a voltage change in the load cell 302 and a signal is transmitted to the product control device 50. The product control device 50 interprets the signal and if the interpretation indicates that the package weight is acceptable it actuates lift cylinder 322 which raises the lift arms 312. Lift arms 312 are located between the plurality of chains 310. Although the use of a load cell for the purpose of determining the weight of the bags is the preferred embodiment a conventional scale that transmits an electronic signal to the product control device could also be used and would be fully equivalent to the preferred embodiment. As stated above the bags movement along the surface of the conveyor are stopped by the stop arms 306. If a bag has passed the weight test then the product lift arms are actuated and function to elevate the bag to a level where they are picked up by the vacuum pick up head 402. The lift arms 312 are connected together through member 320 which is connected to lift cylinder 322. When lift cylinder 322 is extended the product lift arms 312 are raised. Lift cylinder 322, which is actuated by the machine control device 50, thus causes the product lift arms 312 to elevate acceptable bags such that they are picked up by the vacuum pick up head 402. The conveyor surface 304 is driven by a pulley drive means 316.

If a bag tested unacceptable at either test station then the arms 306 are lowered and the unacceptable bag is ejected over the discharge edge of the conveyor surface 304. As best seen in FIG. 2 the ejected bag slides down an ejection ramp 308.

Figure 11:
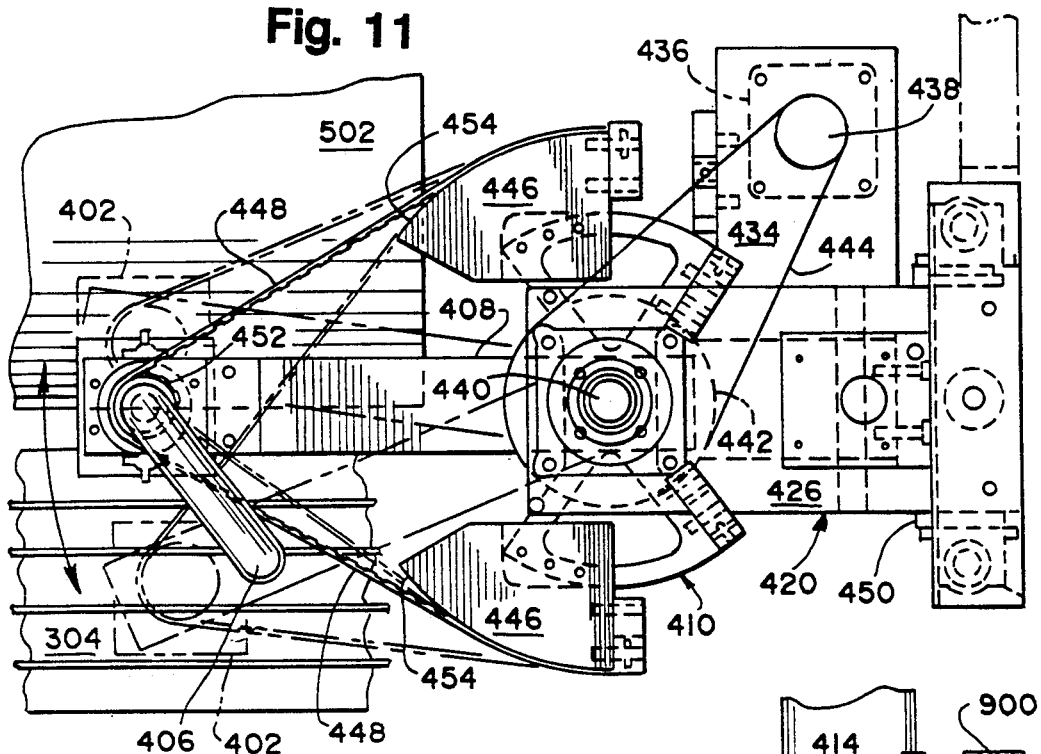
FIG. 11 is a top plan view of the product transfer arm and includes portions of the weigh scale conveyor and the index conveyor.
Figure 12:
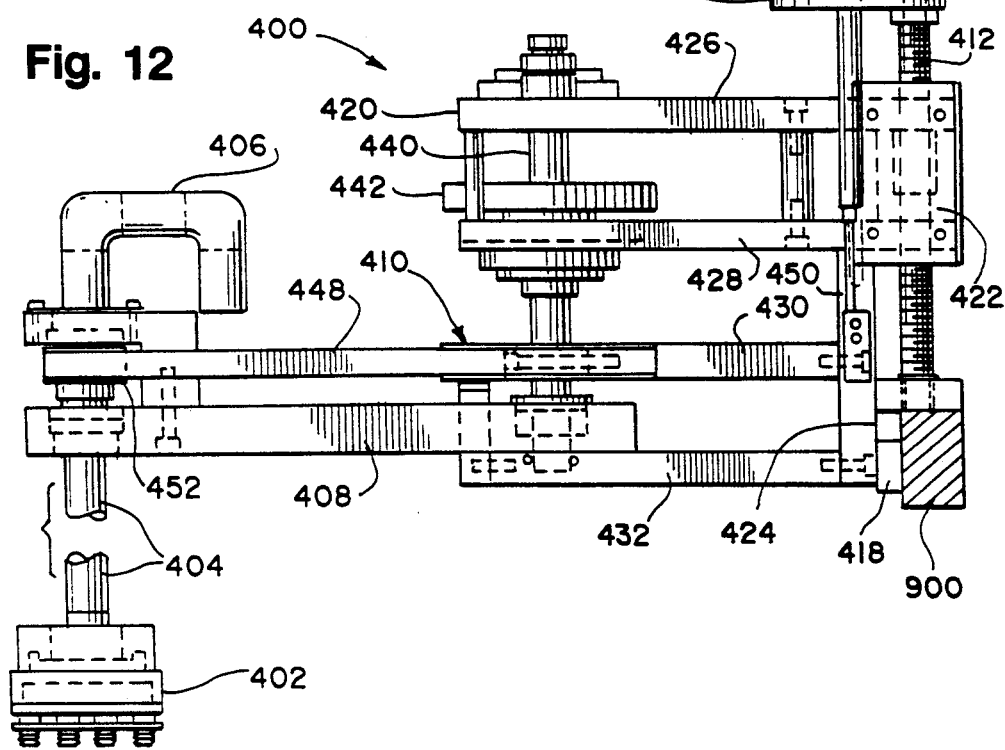
FIG. 12 is a side perspective view of the product transfer arm isolated from the adjacent mechanism.

Referring now to FIGS. 11 and 12 which are top and side views of the product transfer arm 400. It should be noted that in an effort to clearly illustrate all elements of the product transfer arm 400 some components that appear in FIG. 11 do not appear in FIG. 12 and visa versa. When discussing a component that appears in only one of the Figures it will be so stated.

The vacuum pick up head 402 has three different movements, vertical, rotational and swinging about a vertical axis. A transfer arm assembly 420 include a first horizontal arm 426, a second horizontal arm 432, a third horizontal arm 430 and a forth horizontal arm 428. All four horizontal arms are secured to a vertical frame member 450. A block member 422 having a female threaded member extending along a vertical axis is also an integral part of assembly 420.

The motor 414 and motor mount 416 for moving the assembly 420 vertically is illustrated in FIG. 12, but is not shown in FIG. 11. Motor 414 is a gear motor controlled by the machine control device 50 and is actuated during machine set up at the proper time in the cycle to raise and lower the assembly 420 and the vacuum pick up head 402 to accommodate packages of varying thickness. The motor 414 is mounted through a motor mount 416 to framework 900 and drives, through a gear set, a vertical mounted threaded rod 412. The threaded rod 412 is mounted for rotation on framework 900.

The threaded rod 412 extends through the block 422 of the assembly 420 and engages the female threaded member carried by block 422. A lower slide support 418 is provided on the framework 900 which is engaged by a slide surface 424 on the assembly. When the gear motor 414 is actuated causing threaded rod 412 to rotate the entire assembly moves up or down depending upon the direction of rotation that has been imparted to threaded rod 412. This vertical adjustment is used to change the machine from one bag thickness to a different bag thickness.

The mechanism for rotating and swinging the vacuum pick up head will now be described. A motor 436, motor mount 434, sheave 438 and belt 444 are illustrated in FIG. 11 but are not shown in FIG. 12. Servo motor 436 is actuated by the machine control device 50 at the proper time in the cycle to drive sheave in the direction required. Motor mount 434 is secured to the second horizontal arm 428 of assembly, and thus the motor 436 is a part of the assembly.

A vertical shaft 440 is mounted on, for rotation relative to, the free ends of horizontal arms 426, 428, 430 and 432. A sheave 442 is secured to shaft 440 for rotation therewith. Belt 444 drivingly connects sheave 438 to sheave 442. The swing arm 408 is secured to shaft 440 and receives its swinging movement upon rotation of shaft 440. Vertical shaft 404, that has the vacuum pick up head 402 secured to its lower end and the vacuum tube 406 extending out its upper end, is mounted for rotation about a vertical axis in the free end of swing arm 408. A gear or sheave is secured to vertical shaft 404 above the swing arm 408. The swing mechanism 410 include a pair of wing shaped members 446 having arcuate surfaces 454 are fixed to third horizontal arm 430. A belt 448 having a toothed surface is secured at one end to one of the wing shaped members 446 and at its other end to the other wing shaped member 446. The belt 448 extends around the sprocket 452 secured to vertical shaft 404 and is in engagement with arcuate surfaces 452. As can be best seen in FIG. 11 when the swing arm 408 swings from its broken line position over the conveyor surface 304 to its broken line position over the conveyor surface 502 the engagement between gear 452 and belt 448 causes vertical shaft 404 to rotate 180°. It should be noted that if either the position where the vacuum pick up head picks up or deposits the bag is changed, such a change can be accommodated by changing the wing shaped members 446 and or the gear 452.

Figure 13:
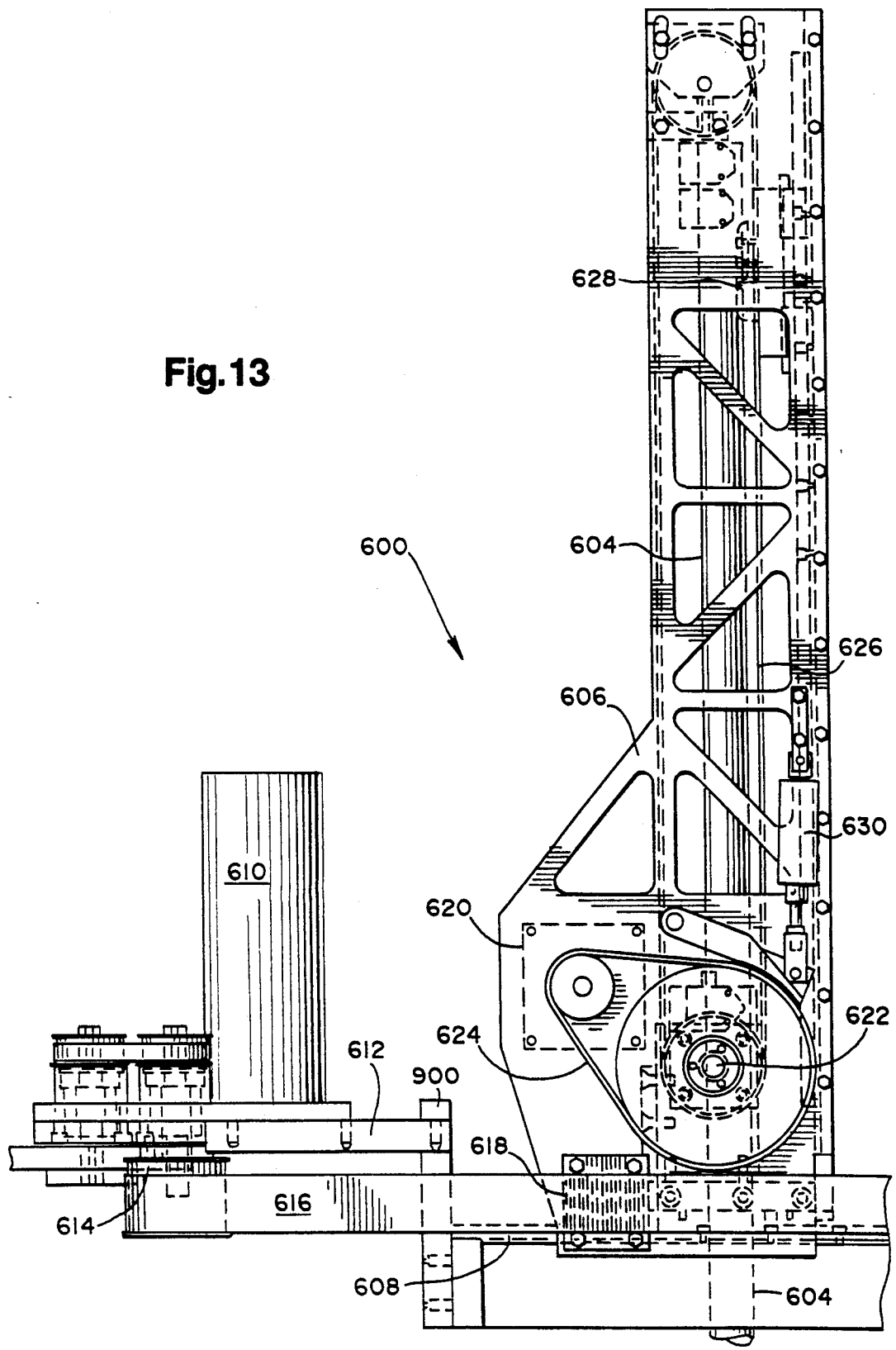
FIG. 13 is a side elevation view of the foundation tower for the pick and place device and the mechanism for imparting horizontal and vertical movement to the pick and place device.

Referring now to FIG. 13 which illustrates details of operating mechanisms for the pick and place device 600. The foundation tower 606 is mounted to slide along a pair of rails 608. Rails 608 are carried by the framework 900. A motor 610, supported on the framework 900 through a motor mount 612, can rotate sheave 614 in either direction. A continuous belt 616, driven by sheave 614, is connected at 618 to the foundation tower 606 and causes it to slide back and forth along the rails 608. A reciprocating tube 604 is mounted in bearings for reciprocation relative to foundation tower 606. A motor 620 imparts rotation in either direction to a shaft 622 through a belt drive 624. The shaft 622 drives a continuous belt 626, that extends vertically up the foundation tower 606, in both directions. The continuous belt 626 is connected at 628 to the reciprocating tube 604 causing it to reciprocate. The vacuum pick-up head 602 is secured to the lower end of tube 604. Energization of both motors 610 and 620 is controlled by the machine control device 50 which is programmed to slide the foundation tower 606, over rails 608, to align itself with index conveyor 502 and to then reciprocate tube 604 at the proper times to pick up a group of bags and place them in the packaging head 708.

Figure 14:
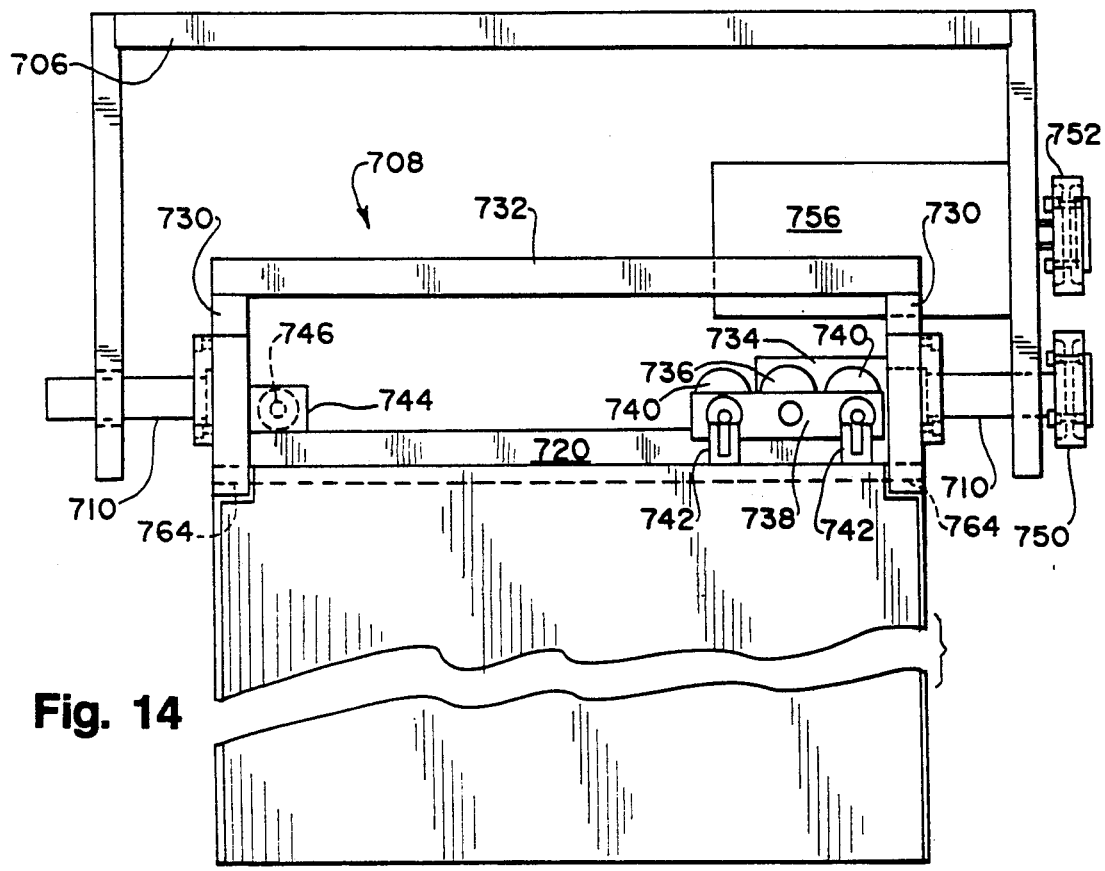
FIG. 14 is a front elevation view of the packaging head in the discharge attitude.
Figure 15:
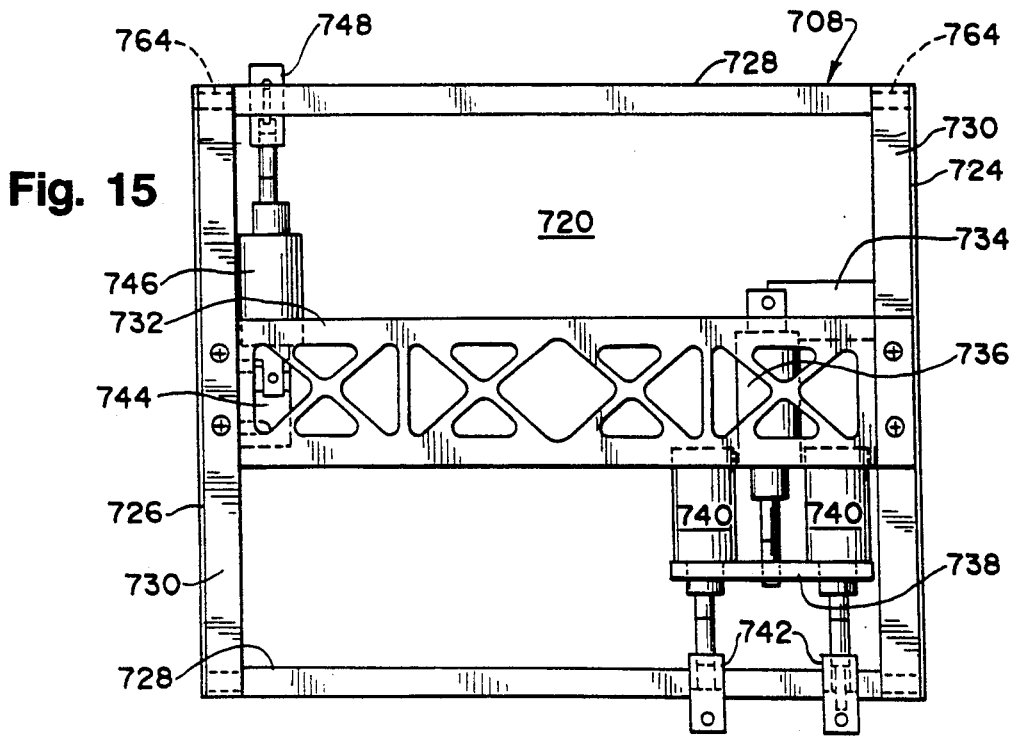
FIG. 15 is a top elevation view of the packaging head in the discharge attitude.
Figure 16:
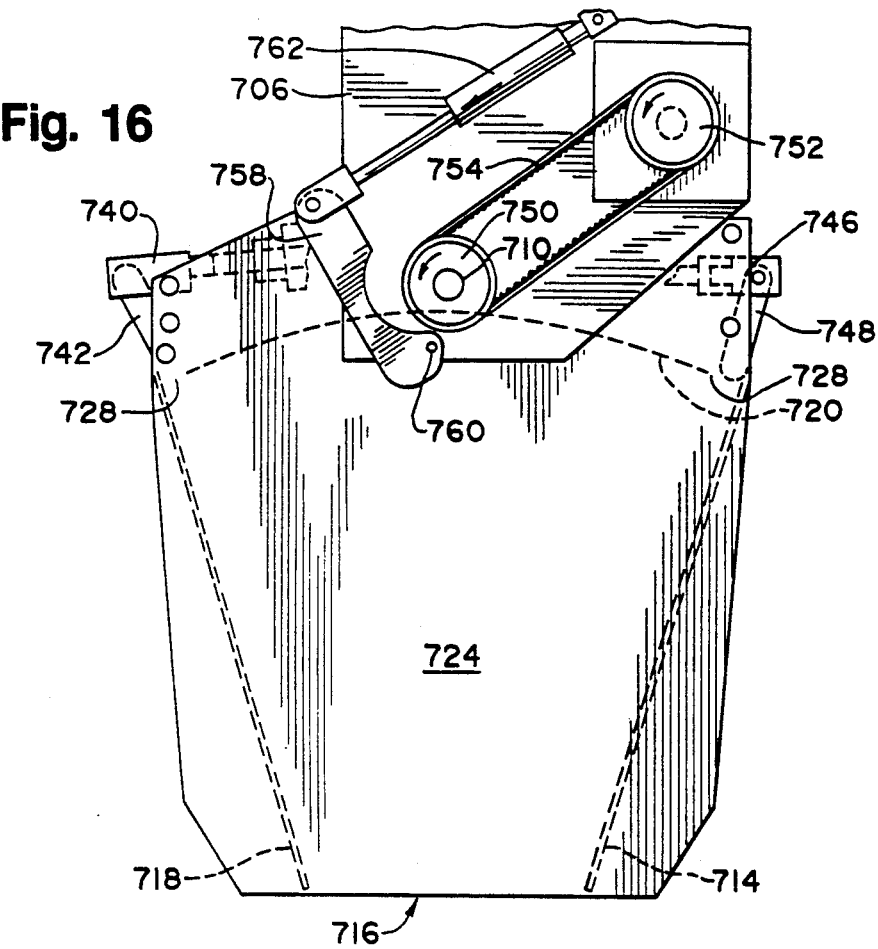
FIG. 16 is a side elevation view of the packaging head in the discharge attitude.

Referring now to FIGS. 14, 15, 16 and 17 which show details of the packaging head 708. As previously described the generally C-shaped support 706 is connected to and reciprocated vertically by reciprocation shaft 704 (See FIGS. 1 and 2). The packaging head 708 is pivotally mounted on support 706 by pivot shafts 710. (See FIG. 14) The packaging head 708, when in the discharge attitude as seen in FIG. 16, has the general shape of an open bottomed box. The top 720 of the opened bottom box is curved and the open bottomed box will be referred to as having a generally concave-cylindrical internal top surface. The top 720 has a pair of parallel edges 728. A cross section of the top 720 as seen in FIG. 16 has an arcuate shape. The open bottomed box includes two fixed sides 724 and 726, a upper clamping door 718 and a lower clamping door 714. The open bottom of the box is identified as 716.

As best seen in FIG. 15 the top 720 has a supporting frame including end braces 730 and a transverse brace 732. The edge of each end brace 730 adjacent the top 720 is arcuate and the top 720 is secured to end braces 730 along their mating arcuate surface. The transverse brace 732 is connected at each end to the end braces 730 and is spaced above the outer surface of top 720. Thus top assembly 720 includes the end braces 730 and the transverse brace 732. The fixed sides 724 and 726 are secured to outer surfaces of end braces 730. The top 720 and fixed sides 724 and 726 are thus connected together as stable sub-assembly by end braces 730 and transverse brace 732. The lower pivoting side 714 and the upper pivoting side 718 are pivotally mounted in the end braces 730 along the parallel edges 728 of top 720 about pivot pins 764.

The means for pivoting lower 714 and upper 718 clamping doors is best seen in FIGS. 14 and 15. A cylinder mount block 734 is secured to the end brace 730 and functions to support the tail-end on a long stroke pneumatic cylinder 736 between top sheet 720 and transverse brace 732. Cylinder 736 is also referred to as the first pneumatic means. The rod-end of pneumatic cylinder 736 is connected to a connecting bar 738 that has a short stroke cylinder 740 connected on each side of the connection for cylinder 736. The pair of cylinders 740 are pneumatically interconnected such that they act together. Cylinders 740 are a part of the second pneumatic means. A pair of pivot lever arms 742 protrude upwardly from upper clamping door 718 and are pivotally connected to the rod-ends of cylinders 740. A second cylinder mount block 744 is secured to the other end brace 730 and functions to support the tail-end of a short stroke cylinder 746. The rod-end of cylinder 746 is pivotally connected to the free end of a pivot lever arm 748 that protrudes upwardly from lower clamping door 714. Cylinder 746 is part of the second pneumatic means. Pivot lever arms 742 and 746 are formed as integral parts of the clamping doors 718 and 714 respectively such that when a force is applied to their free ends the sides pivot about pivot pins 764.

Figure 17:
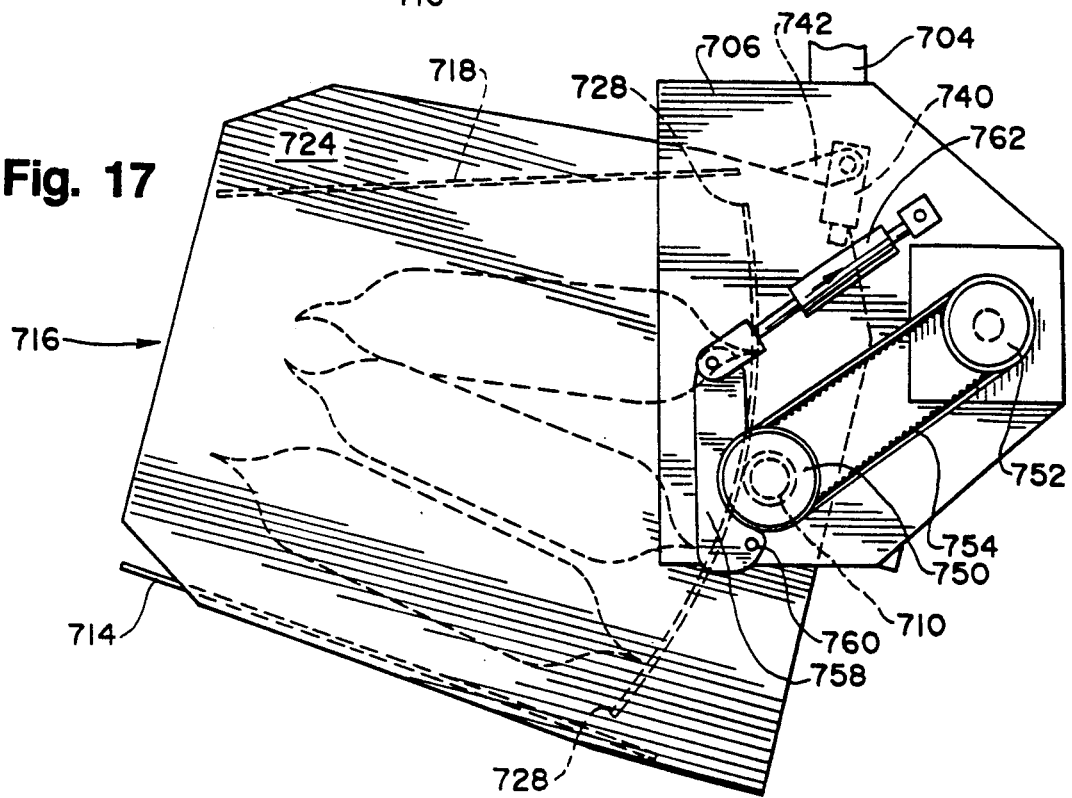
FIG. 17 is a side elevation view of the packaging head in the loading attitude.

The means for pivoting the packaging head 708 relative to the support 706 is best illustrated in FIGS. 16 and 17. Pivot shafts 710 are fixed to end braces 730 and the free end of one pivot shaft 710 extends through support 706 and has a driven sheave 750 secured thereto. A motor 756 is carried on the inner side of support 706 and its drive shaft 766 extends through support 706 and has a drive sheave 752 secured thereto. Sheaves 752 and 750 are interconnected by a belt 754. A breaking device 758 is connected by a pivot 760 to the support 706 adjacent sheave 750. The free end of breaking device 758 is connected to pneumatic cylinder 762. When pneumatic cylinder 762 is retracted breaking device 758 clamps belt 754 against sheave 750 and locks pivot shaft 710 in its location.

The packaging head 708 is shown in its loading attitude in FIG. 17. The loading attitude is the position or attitude of the packaging head 708 when it is being loaded with layers of bags. In the loading attitude the lower clamping door 714 functions as a substantially horizontal surface to support the layers of bags. Lower clamping door 714 is actually slightly inclined toward the concave-cylindrical top surface 720 such that if the layers of bags slide they will slide toward top 720 rather than fall through the open bottom 716. When the layers of bags are being deposited into the packaging head the lower clamping door is as seen in FIG. 17 and the upper clamping door 718 is pivoted upwardly from the position seen in FIG. 17. After the final layer of bags has been deposited into the packaging head 708 pneumatic cylinder 736 is caused to be actuated by the machine control device 50. Actuation of cylinder 736 causes connecting bar 738 and cylinders 740 to move in the down direction as seen in FIG. 15 and to pivot upper clamping door 718 down to a location where it is parallel to lower clamping door 714. At this point in the cycle the second pneumatic means is actuated which sends air to cylinders 740 and cylinder 746. Cylinders 740 cause upper clamping door to pivot from its position parallel with lower clamping door 714 to the location that it occupies in FIG. 17. Actuation of cylinder 746 causes lower clamping door 714 to pivot upwardly such that clamping doors 714 and 718 converge as shown in FIG. 16. With the clamping doors converging the bags have been caused to flare up toward the concave-cylindrical top surface 720 and the bottom of the bags are squeezed more then the tops. This compressing has caused the individual bags as well as the full packaging head of bags to conform to a keystone shape which prevents the bags from falling through the open end 716. This keystone shape is the fundamental breakthrough in the packaging head invention. The keystone shaped bags and packaging head of bags allows the open bottom packaging head to retain its load while in its discharge attitude.

With the packaging head still in its loading attitude, as shown in FIG. 17, and the clamping doors 714 and 718 converging the packaging head is then caused to pivot, about pivot shafts 710, to its discharge attitude which is shown in FIG. 16. In the discharge attitude the open end 716 is horizontal. The packaging head 708 is then lowered into the waiting carton and the second pneumatic means is deactivated which causes the clamping doors 714 and 718 to open up to a parallel position. With the clamping doors 714 and 718 parallel the packaging head 708 has released its hold on the bags and the packaging head can be withdrawn from the carton leaving the bags in the desired vertical attitude.

While the invention has heretofore been described in detail with particular reference to illustrated apparatus, it is to be understood that variations, modifications and the use of equivalent mechanisms can be effected without departing from the scope of this invention. It is, therefore, intended that such changes and modifications be covered by the following claims.

We claim:

1. A method of dispersing product within a sealed bag that has been compacted or segregated which comprises the steps of:

a) depositing the sealed bag on a continuously moving conveyor such that the bag moves with the conveyor;
   b) accelerating the speed of the continuously moving conveyor such that the bag accelerates along with the continuously moving conveyor but the product within the bag does not and consequently moves within the bag;
   c) decelerating the speed of the continuously moving conveyor such that the bag decelerates along with the continuously moving conveyor but the product within the bag does not and consequently moves within the bag.

2. In a machine for packaging bags, that have been filled with product, inflated and pneumatically sealed, in cartons such that the bags are vertically oriented in the carton comprising:

means for conditioning the product including a conveyor upon which the bags are supported and move horizontally in longitudinal alignment, means for accelerating and decelerating the forward speed of said conveyor such that the bag carried thereby change speed with the conveyor and the product in the bag attempts to maintain its velocity resulting in relative movement between the bag and the product contained therein and causing clusters of product to be broken up and spread over an even horizontal layer.

3. In a product conditioning conveyor comprising:

a conveyor having a surface upon which sealed bags having product therein are deposited,
   drive means for imparting a continuous movement in one direction to said conveyor,
   means for accelerating and decelerating the speed of said drive means
   said conveyor surface being formed from material that will result in sufficient friction force, between the conveyor surface and the bag, to cause the sealed bags to move along with said conveyor surface during acceleration, deceleration and constant movement of the conveyor,
   the friction force between the product within the bag and the inner surface of the bag being insufficient to cause the product to move with the bag during acceleration and deceleration of the conveyor such that the product is dispersed within the confines of the bag as the bag proceeds along the conveyor.

4. The invention as set forth in claim 3, wherein the invention further comprises:

said conveyor includes cylindrical drive rolls having grooves formed along their surface, and a plurality of continuous belts, lying in the grooves, and driven by the cylindrical drive rolls, and the surface of said continuous belts functioning as the conveyor surface.

5. The invention as set forth in claim 4 wherein the invention further comprises:

adjustable width guide means extending along said conveyor and adjustable to the bag width for restricting the bags to be conveyed in the direction of their longitudinal axis.

6. The invention as set forth in claim 3 wherein the invention further comprises:

said conveyor being comprised of a plurality of continuous elastic bands spaced from each other to form said conveying surface.

7. The invention as set forth in claim 3 wherein the invention further comprises:

adjustable width guide means extending along said conveyor and adjustable to the bag width for restricting the bags to be conveyed in the direction of their longitudinal axis.

8. In a machine for conditioning product contained in a sealed bag comprising;

a frame structure, a conveyor having a substantially horizontal conveying surface upon which the bags are deposited mounted on said frame structure, drive means for driving said conveyor at a constant rate of speed mounted on said frame structure, means for accelerating and decelerating the constant rate of speed that has been imparted to the conveyor by said drive means, mounted on said frame structure, such that bags carried by the conveyor change speed with the conveyor and the product in the bag attempts to maintain a constant velocity, resulting in relative movement between the bag and the product contained therein and causing any clusters of product to be broken up and the product spread over an even horizontal layer.

9. The invention as set forth in claim 8 wherein the invention further comprises:

said conveyor including a drive and a driven roller mounted for rotation on said frame structure, and a continuous conveyor wrapped around the rollers, said drive roller including a sprocket mounted thereon for imparting drive thereto;

said means for driving said conveyor at a constant rate of speed including a drive shaft mounted for rotation on said frame structure below said drive roller, said drive shaft having a sprocket mounted thereon in alignment with the drive roller sprocket;

said means for accelerating and decelerating the constant rate of speed including a pair of fixed idler shafts mounted for rotation on said frame structure, sprockets mounted on said pair of fixed idler shafts, a pair of movable sprockets mounted for rotation on a change speed unit, said change speed unit mounted for reciprocating movement on said frame structure, means for reciprocating said change speed unit, a drive belt extending from said drive shaft sprocket around one of the movable idler sprockets, around the drive roller sprocket, around one of the fixed idler sprockets, around the other movable idler sprocket, around the other fixed idler sprocket and back to the drive shaft sprocket, means for energizing said means for reciprocating said change speed unit.

10. The invention as set forth in claim 8 wherein the invention further comprises:

said conveyor being comprised of a plurality of continuous elastic bands spaced from each other to form said substantially horizontal conveying surface.

11. The invention as set forth in claim 9 wherein the invention further comprises:

said conveyor being comprised of a plurality of continuous elastic bands spaced from each other to form said substantially horizontal conveying surface.

12. The invention as set forth in claim 8 wherein the invention further comprises:

adjustable width guide means extending along said conveyor and adjustable to the bag width for restricting the bags to be conveyed in the direction of their longitudinal axis.

* * * * *